United States Patent
Dang et al.

(10) Patent No.: US 6,810,036 B1
(45) Date of Patent: Oct. 26, 2004

(54) CALLER IP ADDRESS

(75) Inventors: Luan D. Dang, Santa Clara, CA (US); Wilkie Lau, Fremont, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/224,674

(22) Filed: Dec. 31, 1998

(51) Int. Cl.[7] ............................................. H04L 12/66
(52) U.S. Cl. ...................... 370/356; 370/389; 370/475
(58) Field of Search ................................ 370/356, 351, 370/352, 401, 353, 354, 355, 475, 389, 259, 260; 379/93.01, 93.03, 90.01, 201, 265, 266, 309, 100.08

(56) References Cited

U.S. PATENT DOCUMENTS

| | | | | |
|---|---|---|---|---|
| 5,608,786 A | * | 3/1997 | Gordon | 370/352 |
| 5,724,412 A | * | 3/1998 | Srinivasan | 379/93.23 |
| 5,838,665 A | * | 11/1998 | Kahn et al. | 370/260 |
| 5,995,606 A | * | 11/1999 | Civanlar et al. | 379/207.13 |
| 6,011,794 A | * | 1/2000 | Mordowitz et al. | 370/389 |
| 6,038,602 A | * | 3/2000 | Ishikawa | 709/227 |
| 6,067,350 A | * | 5/2000 | Gordon | 379/90.01 |
| 6,075,783 A | * | 6/2000 | Voit | 370/352 |
| 6,078,583 A | * | 6/2000 | Takahara et al. | 370/356 |
| 6,108,704 A | * | 8/2000 | Hutton et al. | 709/227 |
| 6,192,045 B1 | * | 2/2001 | Williams et al. | 370/352 |
| 6,236,653 B1 | * | 5/2001 | Dalton et al. | 370/352 |
| 6,243,373 B1 | * | 6/2001 | Turock | 370/352 |
| 6,243,443 B1 | * | 6/2001 | Low et al. | 379/88.17 |
| 6,389,127 B1 | * | 5/2002 | Vardi et al. | 379/209.01 |
| 6,430,176 B1 | * | 8/2002 | Christie, IV | 370/355 |
| 6,473,423 B1 | * | 10/2002 | Tebeka et al. | 370/352 |
| 6,515,996 B1 | * | 2/2003 | Tönnby et al. | 370/401 |
| 6,704,294 B1 | * | 3/2004 | Cruickshank | 370/265 |

OTHER PUBLICATIONS

"Whitepaper"; pp1–5:www.aplio.com.

* cited by examiner

*Primary Examiner*—Dang Ton
*Assistant Examiner*—Tri H. Phan
(74) *Attorney, Agent, or Firm*—Blakely Sokoloff Taylor & Zafman, LLP

(57) ABSTRACT

The present invention provides a system and method for providing an IP address of a user's computer and establishing a transparent data connection allowing multimedia collaboration. In using the present invention, the first user (or the caller) establishes a voice call by dialing the second user (or the called). The caller's telephone will then contact the caller's monitor application running on the caller's user's desktop computer and will retrieve the current IP address and deliver it to the caller's telephone. The called telephone will then receive the IP address of the caller and forward it to the called's desktop computer via the serial or USB connection. The called's application will then start a multimedia collaboration application with the IP address of the caller's computer.

19 Claims, 2 Drawing Sheets

CALLER IP ADDRESS

BACKGROUND OF THE INVENTION

1. Field of the Invention

The present invention relates generally to the field of data connection setups, and more particularly, to the transparent data connection setup allowing for multimedia collaboration through the exchange of Internet protocol (IP) address.

2. Description of the Related Art

As computer networking becomes more available and more widespread, most business organizations have grown to rely heavily on network services. Similarly, individuals are incorporating computers into all aspect of their daily lives and are beginning to rely on network services. As a result, it has come to be generally accepted that multimedia collaboration will enhance the quality of communication, and lifestyle for both business organizations and the average consumer. The complexity of setting up multimedia connections, however, has deterred its widespread use. Although most people can make a telephone call without undue effort, not everyone can set up a computer to make a multimedia collaboration to share data in real-time. For example, to establish a simple voice connection, an individual must simply lift up the handset of a telephone and dial the phone number of the desired party. To establish a data connection for multimedia communication, however, an individual needs the data address of the computer to be called (i.e., the IP address if the called computer has a LAN that is based on TCP/IP). Obtaining the IP address of a computer a caller wishes to communicate with, however, is often a frustrating process.

The type of computer used to establish a multimedia communication is virtually unlimited and may include a personal computer, a workstation, or a portable computer, etc. The computer merely needs to be coupled to the network, typically through use of a modem, or similar communications adapter, connected to a serial port of the computer. Through this connection, the computer has access to the network and the services and resources thereon. The computer typically includes the ability to interoperate with a dynamic Internet protocol (IP) address assignment. Some protocols such as TCP/IP require any node on the network to have an IP address to communicate on the network. By having multiple servers on the network, however, there is the potential that IP addresses will be assigned dynamically to all nodes on the network. Thus, the dynamic aspect of most IP addresses further complicates the ability of a typical user in routinely establishing a multimedia connection with another user over the network. Since an individual's IP address may vary from use to use.

In the modern office, most individuals have a telephone on their desk with a connection to the PBX or to the central office and a desktop computer connected to the local area network (LAN). Traditionally, establishing a multimedia communication is accomplished by first creating a voice connection via the telephone and then obtaining from the called party the IP address of the called party's computer. Once the IP address of the called party's computer has been ascertained, the caller can enter this IP address into his computer and make a connection over the data network between the two computers. As shall be illustrated below, however, this procedure is both convoluted and error-prone.

To establish a multimedia collaboration between two individuals, one current procedure involves multiple steps requiring human interaction. Thus, the current procedure of establishing a multimedia collaboration is very prone to human error. As shall be illustrated in FIG. 1, for example, Person A has access to both a telephone 10 and a computer 12, and likewise, Person B has access to both a telephone 14 and a computer 16. Person A's telephone 10 is connected to Person B's telephone 14 via either the PBX or the central office line 18, whereas both Person A's computer 12 and Person B's computer 16 are connected to the local area network (LAN). To establish a multimedia collaboration between Person A and Person B, Person A must call Person B over the telephone and ask for Person B's IP address. The typical IP address is a 12 digit, often dynamic, number that Person B must determine and then recite to Person A. To then establish the multimedia collaboration, Person A must then enter Person B's IP address into a multimedia collaboration application. This method is very prone to human error.

There are several opportunities for human error in the above-described method. First, Person B must be able to locate (i.e., determine or find) the IP address associated with his computer network connection. The IP address is generally represented by a 12 digit number. This 12 digit number is sometimes dynamic (i.e., varying from use to use) and thus is often unfamiliar to a user. In reciting the 12 digit number to Person A, Person B must correctly relay the IP address and not misread or transpose any digits, or collaboration will not be possible. Further, assuming Person B has correctly recited the correct IP address, Person A must still correctly enter the 12 digit number representing Person B's IP address into the multimedia application in order to establish the desired connection. Thus there is the potential for human error at a minimum of three instances in the attempt by Person A and B to establish the desired multimedia connection. Another prior art attempt to establish a multimedia connection is illustrated in FIG. 2. In this second described attempt at establishing a multimedia connection, Person A must still call Person B over the analog telephone line 28. Person A and Person B then agree upon a unique token number for the service provider. Both Person A and Person B hang up their respective telephones 20 and 24 (thus saving on the toll charge) and each contact the data network 29 from their respective computers 22 and 26. Person A and Person B will then contact a separate server 25 (the method of connecting this additional server 25 is already known by both parties) and provide the unique number agreed upon. Once contacting the server 25, each individual will inquire if the specified unique number has already been established. If it has, that respective individual retrieves the IP address from the other individual, while if it has not, that respective person leaves his respective IP address for the other. As with the above described technique, this second technique is also prone to error in that both Person A and Person B must correctly write down and subsequently enter the agreed upon unique number. Additionally, this second technique has the added requirement of a separate server 25.

Each of the known methods of establishing a multimedia collaboration are not only time consuming, they are also significantly prone to human error and quite often confusingly complicated for the unsophisticated user. A method establishing a multimedia communication that would eliminate the cumbersome procedure of first setting up a voice-related data connection and then verbally exchanging IP addresses will not only be less time-consuming, but also be more reliable due to the reduction of human involvement. Further, a method that would establish a data connection for multimedia communication that is transparent to the user and virtually error free will save a significant amount of time and expense.

SUMMARY OF THE INVENTION

The present invention provides a system and method for providing an IP address of a user's computer and establishing a transparent data connection setup allowing multimedia collaboration. In the present invention, both the first and second user have telephones connected to the PBX or central office and desktop computers connected to the local area network. Additionally, each user's telephone is connected to that respective user's computer via a parallel, serial, or USB cable. The system software of the present invention is comprised of a standard third party multimedia collaboration tool and a monitoring application initiated with the start-up of the computer.

In using the present invention, the first user (or the caller) establishes a voice call by dialing the second user (or the called), and then presses a key on the telephone to initiate the data collaboration. The caller's telephone will contact the caller's monitor application running on the caller's desktop computer and will retrieve the caller's current IP address- and deliver it to the caller's telephone. The called telephone will then receive the IP address of the caller and forward it to the called's desktop computer. The caller's application will then start a multimedia collaboration application with the IP address of the caller's computer.

DETAILED DESCRIPTION OF THE INVENTION

This disclosure describes a system and method for providing a transparent data connection setup allowing multimedia collaboration while eliminating the previously required voice-related data connection. The present invention allows a first user to dial a second user via the telephone and with the press of a button or entering of a code start off an application on the computer to start sharing multimedia data between the first and second user. The following description sets out numerous specific details to provide a more thorough understanding of the present invention. However, one skilled in the art will appreciate that the present invention may be practiced without these specific details. In other instances, this description does not describe well known features and techniques in detail, such as database accessing software, computer network systems, and the Internet, in order not to obscure the present invention.

In the modern office, most individuals have a telephone on their desk with a connection to the PBX or to the central office and a desktop computer connected to the local area network (LAN). It is generally accepted that multimedia collaboration will enhance the quality of communication, for both business organizations and the average consumer. The complexity of setting up multimedia connections, however, has deterred its widespread use. Thus, the simplicity of the present invention in establishing a multimedia connection virtually transparent to both the caller and the called party provides numerous advantages.

The present invention provides the seamless exchange of a caller's IP address for setting up data connections in a similar manner to how caller ID via the telephone is currently being implemented. Thus, the caller IP address system of the present invention eliminates the difficult, unyielding, and error-prone procedure of first setting up a voice related data connection.

In the past, for a caller to obtain the IP address of a called party, the caller would first have to physically call the called party via the telephone and verbally request the called party's IP address. At that time, the called party would typically have to look up his IP address (since it is potentially dynamically assigned) and communicate the IP address to calling party. Finally, the calling party could then enter the desired IP address into a multimedia collaboration application and establish a multimedia connection. In contrast, the present invention eliminates as unnecessary the steps of looking up the IP address, communicating the IP address to the calling party, and entering the IP address into the calling party's computer. Thus, not only does the present invention save significant time and effort, it also eliminates the error-prone steps of the IP address exchange process.

Figure 1:
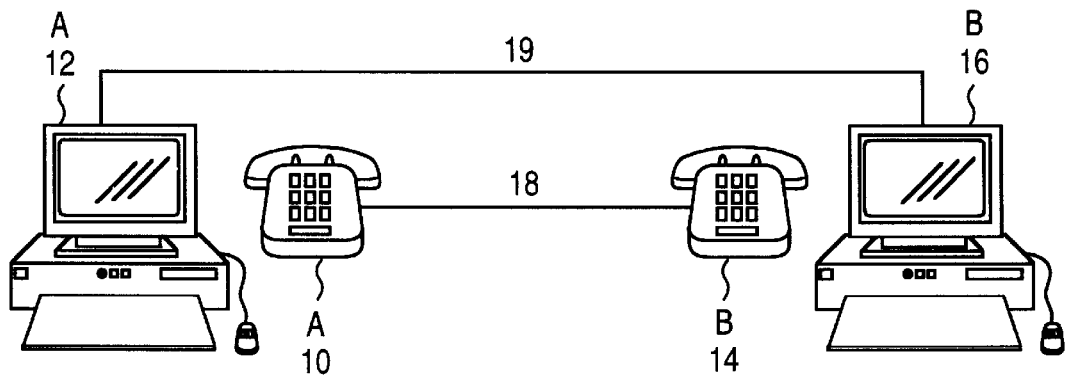
FIG. 1 is a first embodiment of a prior art method of establishing a multimedia connection for collaboration.
Figure 2:
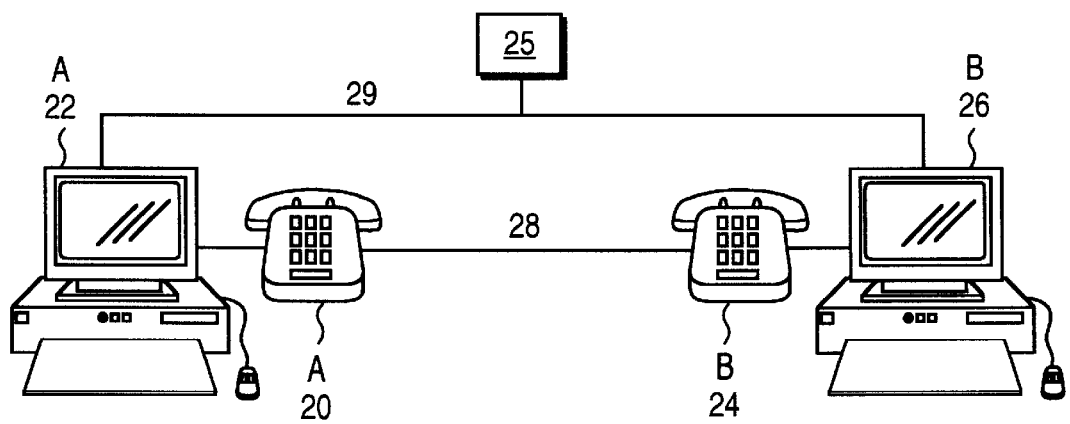
FIG. 2 is a second embodiment of a prior art method of establishing a multimedia connection for collaboration.
Figure 3:
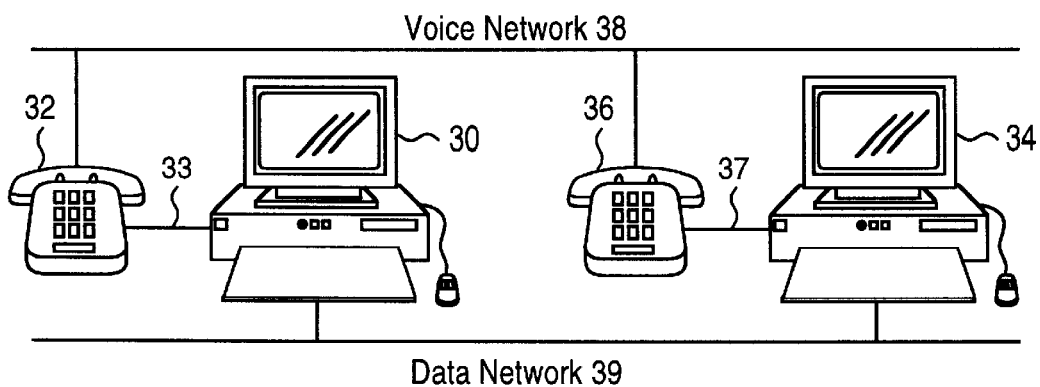
FIG. 3 is a block diagram illustrating the hardware components of the caller IP address system of the present invention.

The hardware system of the present invention may be comprised of the numerous components known in the art, samples of which are illustrated in FIG. 3. Each of the parties involved possess a telephone 32 and 36 connected to either a PBX or central office voice network 38. The telephone line may be either a digital line set or an analog line that has the means to send signaling over the line. For example, use of an analog line containing a custom local area signaling service (CLASS) feature will allow a caller ID signal to be transferred over the analog line. The telephone and telephone lines described are commonplace and already in most if not all work stations.

Second, the present invention requires the use of a computer system 30 and 34, such as but not limited to a personal computer, a workstation or a portable computer, as found in most workplace desktop computers. The desktop computer needs to be coupled to the local area network 39, typically through the Ethernet or other similar communications adapter. Through this connection, the desktop computer has access to the data network and the services and resources thereon. As with the telephone and telephone lines discussed above, the desktop computer and data network connection are already a standard feature of most workplace environments.

For operation of the present invention, the telephone must also be connected to the respective desktop computer. Typically, the telephone 32 and 36 and desktop computer 30 and 34 are interconnected via a parallel, serial, or USB cable 33 and 37. The telephone and desktop computer may also be connected through the PBX if the PBX has an interface with the data network.

The system software of the present invention comprises two primary components. First is the monitor application. The monitor application is initiated with the start-up of the computer and continuously monitors the parallel, serial, or USB connection to the telephone. The monitor application will also provide the actual retrieval of the current IP address and delivery of the same to the telephone via the parallel, serial, or USB connection when requested.

A second primary software component of the system of the present invention is any standard third party multimedia collaboration tool (e.g. Net Meeting). The multimedia collaboration component of the software will establish the actual data connection and allow for multimedia collaboration between the two systems once the IP address has been exchanged.

Figure 4:
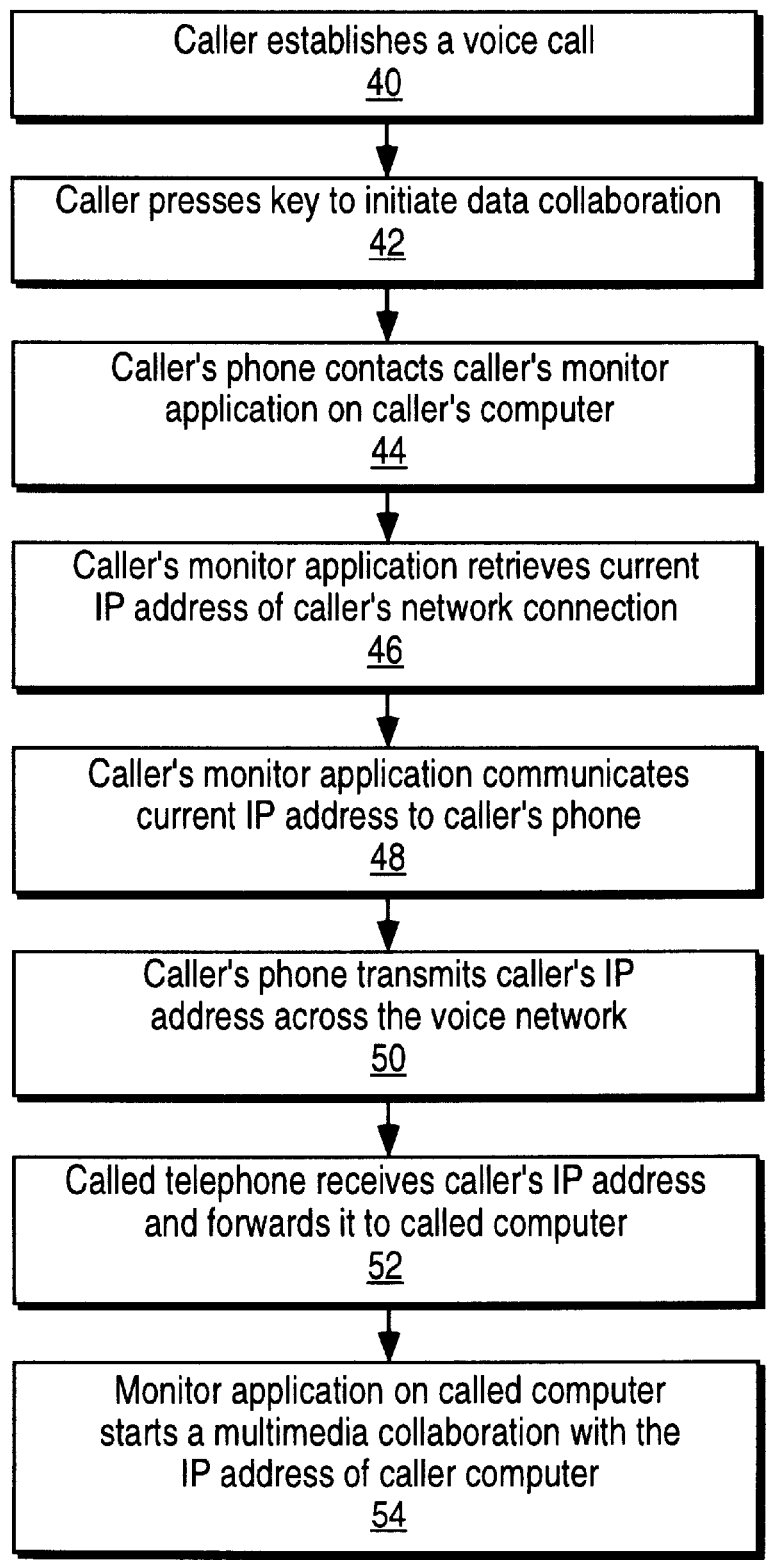
FIG. 4 is a flow chart diagram illustrating the basic steps followed to achieve the seamless exchange of the caller IP address through use of the present invention.

In one embodiment, the present invention is comprised of several basic and simplistic steps as illustrated in the flow chart diagram of FIG. 4. First, the first user or caller must establish a voice call (step 40). The voice call may be placed via a telephone over either a digital line set or an analog line that has the means to send signaling over the line.

Once the caller has placed the initial voice call and the call is answered, the caller presses a key on his phone to signal the system to initiate data collaboration and retrieve the IP address of the called party's computer network connection (step 42). Alternatively, if the caller's phone does not possess a special function key to transmit the signal to the system to initiate the data collaboration and begin the retrieval process, a particular code can be programmed into the phone system to serve the same function (e.g., similar to the *69 function for automatic redial used on many current phone systems).

Once the data collaboration is initiated, the caller's phone contacts/signals the caller's monitor application stored on the caller's computer via the parallel, serial, or USB connection (step 44). Throughout this process, the monitor application has continuously monitored the parallel, serial, or USB connection to the phone. Thus, as soon as the caller's phone contacts the caller's monitor application, the monitor application retrieves the current IP address of the caller's computer's network connection (step 46). Note that although most workplace computer systems maintain a static IP address, other computer systems, particularly those used in the home, have an IP address that functions as a dynamic entity that is reassigned and changes each time the computer system logs onto the network.

Once the current IP address of the caller's network connection is retrieved, the caller's monitor application communicates the current IP address of the caller's network connection to the caller's phone via the parallel, serial, or USB connection (step 48). Upon receiving the current IP address, the caller's phone transmits the caller's IP address across the voice network (i.e., the telephone line connecting the caller's phone and the called phone) (step 50). The called telephone then receives the caller's IP address and forwards it via the parallel, serial, or USB connection to the monitor application in the called computer desktop (step 52). At this point, the monitor application on the called computer starts a multimedia collaboration application using a multimedia collaboration tool, such as a Net Meeting using with the current IP address of the caller computer (step 54).

In an alternative embodiment, the caller IP address is automatically retrieved and forwarded as soon as the call is placed. In other words, the caller IP address could be forwarded and displayed in some manner prior to the phone being answered (analogous to the manner in which caller ID currently functions). In this embodiment, if the phone system was not prepared for receiving the caller IP address then the signal would just be ignored. However, if the phone system was prepared, then the caller IP address would be automatically transferred and received.

Methods of receiving the caller IP address are numerous. Such methods include but are not limited to storing the IP address in a library file or database, displaying a web page linked to that particular IP address, automatically establishing a data-sharing channel between the two phone systems, establishing a video phone between the two phone systems, etc.

The present invention provides several advantages over the prior art. First, a seamless method transparent to the parties involved is provided to establish a multimedia connection. Second, the ease of establishing a multimedia connection opens the door on making feasible several possibilities particularly useful in the workplace, such as automatically establishing a data-sharing channel between two phone systems or establishing a video phone connection. Third, the present invention allows users to maintain the voice network connection simultaneously with the data network connection. This is a significant advantage in current technology where the voice networks are more consistently reliable when delivering voice data.

Most importantly, the present invention provides a system capable of providing a current IP address even when the IP address is a dynamic entity. This last feature of the present invention is a particular improvement over the traditional caller ID technology currently limited to providing static caller ID's stored within the PBX. Since an IP address is typically not static and may vary every time a computer connects with the data network, traditional caller ID technology would not be beneficial in this scenario. Instead, every time a multimedia connection is desired, the system must go back into the computer and retrieve the most recent. IP address. Thus, the present invention provides a particularly useful and advantageous benefit to the computer industry.

We claim:

1. A method comprising the steps of:
    continuously monitoring a connection of a first phone to a first computer;
    connecting said first phone to a second phone across a voice network;
    contacting said first computer via said connection of said first phone;
    retrieving a current IP address of a data network connection for said first computer from said first computer and transmitting said IP address to said first phone; and
    transmitting said IP address from said first phone to said second phone across said voice network.

2. The method of claim 1 wherein said step of contacting a first computer via a first phone further comprises contacting a monitor application stored in said first computer, and said step of retrieving said IP address from said first computer and transmitting said IP address to said first phone further comprises said monitor application retrieving said IP address from said first computer and transmitting said IP address to said first phone.

3. The method of claim 1 wherein said step of contacting a first computer via a first phone further comprises contacting a first computer via a first phone via a parallel, serial or USB connection; and said step of transmitting said IP address from said second phone to a second computer further comprises transmitting said IP address from said second phone to a second computer via a parallel, serial, or USB connection.

4. The method of claim 1 further comprising a step of establishing multimedia collaboration between said first computer and a second computer connected to said second telephone using said IP address to establish a connection between said first computer and said second computer using said data network connection.

5. The method of claim 4 wherein said step of establishing a multimedia collaboration further comprises establishing a multimedia collaboration between said first and second computers using said IP address through use of a multimedia collaboration tool.

6. A method of providing an IP address from a computer of a caller, comprising the steps of:

establishing a voice call from a first phone to a second phone across a voice network;

contacting a monitor application stored in said computer of the caller using said first phone, said monitor application monitoring a connection of said first phone;

retrieving the current IP address of a data network connection for said computer of the caller and communicating said IP address to said first phone using said monitor application;

transmitting said IP address from said first phone to a second computer across said voice network; and, establishing, transparent to a caller having access to said first phone, a multimedia collaboration between said first and second computers using said IP address to establish a connection between said first computer and said second computer using said data network connection.

7. The method of claim 6 wherein said step of contacting a monitor application stored in said computer of said caller using said first phone further comprising contacting a monitor application stored in said computer of the caller via a parallel, serial, or USB connection.

8. The method of claim 6 wherein said step of establishing a multimedia collaboration between said first and second computers using said IP address further comprises establishing a multimedia collaboration between said first and second computers using said IP address through use of a multimedia collaboration tool.

9. A caller IP address system, comprising:

a phone, said phone connected to a voice network;

a computer connected to said phone, said computer connected to a data network; and a monitor application stored within said computer for retrieving a current IP address of a data network connection for said computer from said computer and transmitting said IP address to said phone transparent to a caller having access to said phone such that said phone transmits said current IP address from said phone to a second phone across said voice network.

10. The system of claim 9 wherein said computer is connected to said phone via a parallel, serial, or USB connection.

11. The system of claim 9 wherein said data network is a local area network.

12. The system of claim 9 wherein said voice network is a PBX or central office network.

13. A method comprising:

monitoring a connection of a first phone by an application stored in a first computer;

providing a current IP address of a data network connection for said first computer by said first computer in response to an event by said first phone; and transmitting said IP address by said first phone to a second phone over a voice network connection for use in establishing a data network connection with said first computer transparent to a user of said first phone and said first computer.

14. The method of claim 13 wherein the monitoring of the connection by said application is continuous.

15. The method of claim 13, wherein said connection of said first phone is one of a parallel, serial and USB connection.

16. The method of claim 13, wherein both said voice network connection and said data network connection are maintained.

17. The method of claim 13, wherein the event prompting said IP address to be provided comprises:

placing a voice call from said first phone to said second phone;

establishing said voice connection network upon said second phone being answered; and entering a particular code of said first phone after said voice connection is established.

18. The method of claim 17, wherein the event prompting said IP address to be provided comprises:

depressing a function key of said first phone after said voice call is placed and answered.

19. The method of claim 1 wherein said transmitting of said IP address to said second phone establishes a data network connection simultaneously with a voice network connection.

* * * * *